(12) United States Patent
Borland (10) Patent No.: US 8,061,282 B2
(45) Date of Patent: Nov. 22, 2011

(54) SOIL OPENING IMPLEMENTS PARTICULARLY FOR SEED PLANTING

(75) Inventor: Robert Borland, Wolverhampton (GB)

(73) Assignee: BHE Agriculture Limited (GB)

( * ) Notice: Subject to any disclaimer, the term of this patent is extended or adjusted under 35 U.S.C. 154(b) by 0 days.

(21) Appl. No.: 12/676,413

(22) PCT Filed: Sep. 8, 2008

(86) PCT No.: PCT/GB2008/050795
§ 371 (c)(1),
(2), (4) Date: May 4, 2010

(87) PCT Pub. No.: WO2009/030958
PCT Pub. Date: Mar. 12, 2009

(65) Prior Publication Data
US 2011/0126746 A1 Jun. 2, 2011

(30) Foreign Application Priority Data
Sep. 8, 2007 (GB) .................................. 0717561.5

(51) Int. Cl.
*A01C 5/04* (2006.01)
*A01C 7/00* (2006.01)
*A01C 21/00* (2006.01)

(52) U.S. Cl. ............... 111/89; 172/21; 172/60; 172/95; 172/118; 172/125

(58) Field of Classification Search .................. 111/128, 111/100–122, 89–99; 172/21, 22, 35–61, 172/82–125
See application file for complete search history.

(56) References Cited

U.S. PATENT DOCUMENTS
4,342,270 A * 8/1982 Lofgren et al. ............... 111/117

FOREIGN PATENT DOCUMENTS
| DE | 2559523 A1 | * | 1/1977 |
| DE | 3311926 A1 | * | 12/1983 |
| FR | 2476970 A | * | 9/1981 |
| GB | 2439908 A | * | 1/2008 |

* cited by examiner

Primary Examiner — Christopher J. Novosad
(74) Attorney, Agent, or Firm — Barnes & Thornburg LLP

(57) ABSTRACT

A soil opening implement comprising a frame (5) adapted to be moved across a ground surface to be opened, a soil opener (1) mounted on the frame for a repetitive cyclic movement to case the soil opener to penetrate the ground at a plurality of spaced positions to form a line of holes in the soil, and adjustment for varying the pitch of the holes, that is the spacing between adjacent holes in the direction of movement of the implement. The implement has the facility to deliver objects, such as seeds to fertilizer granules in the holes, either one object per hole or multiple objects per hole. The implement includes a hopper (11) for holding a supply of objects and for delivering the objects to the soil opener which is in the form of a substantially vertical hollow tube (11b) through which the objects are fed and delivered to the holes. The lower end (3) of the tube is angled and tapers to a point, the taper being formed by an angled cut on the trailing side of the opener relative to the direction of movement of the implement.

9 Claims, 6 Drawing Sheets

SOIL OPENING IMPLEMENTS PARTICULARLY FOR SEED PLANTING

FIELD OF THE INVENTION

This invention relates to soil opening implements, particularly for the planting of seeds or other objects (such as fertiliser granules) in the ground. The invention will hereinafter be described mainly in relation to the planting of seeds, which is the major application.

BACKGROUND TO THE INVENTION

It is often required when planting seeds to have the seeds placed in the soil at regular distances apart and at constant depth from the soil surface. The seeds need to be adequately protected from pests, for the earth to be disturbed marginally around the seed and the rest of the earth to be disturbed as little as possible. It is also required when planting that the whole planting device can be turned easily whilst in operation to allow for turning in the field and planting in non rectilinear lines. For economic and environmental reasons it is desirable that as little fuel as possible is burned during the crop establishment practices.

Current common soil opener devices require a finely tilled seed bed or in cases where conservation or zero tillage is used as a farming method then the planters are very heavy and or large in order to carry out accurate soil opening and seed placement duties. In nearly all cases these machines open soil slots that do not protect the seeds particularly well and are not very accurate, thus attacking of the seed by pests and the variances in seed depth and placement result in lower crop germination rates and uneven crop growth which affect the ultimate crop yield. In cases of planting seed into a finely tilled seed bed a minimum of two prior soil activities need to take place before a fine seed bed is achieved. Both of these prior activities require large amounts of power and draught which means large, heavy, powerful tractors are used and these compact the soil and burn large amounts of fuel. Other possible severe results of using a finely tilled seed bed are depletion of the soil's fertility, self protection mechanisms and moisture content. In cases where conservation or zero-tillage is used the seeds are planted directly into the field without any prior soil activities and thus the problems of large amounts of fuel being burnt, soil compaction, fertility, protection and moisture loss are significantly reduced or eliminated. However in order for the current planting devices to open a satisfactory soil slot, using conservation and zero-tillage practices, a heavy and or large planting machine is required which is hard to turn in the field and such a machine still has a high draught requirement which requires a large heavy tractor. Some current soil openers can suffer from blockages caused by soil and other debris.

Some soil openers which are known in the art are discussed below.

WO 82/03962 discloses a pit-forming implement capable of forming a series of separate pits which are capable of collecting surface water. The implement comprises a plurality of soil openers which are distributed directly from a drum, via apertures.

SU 459185 discloses a tree seedling planter for planting seedlings, in the form of hole dibber with a spring-loaded rocking arm, one end of which is provided with a dibbing point.

EP 0738460 discloses an apparatus for planting young plants, wherein the plants are deposited by a human operator. The apparatus comprises a plurality of soil openers, wherein each of the soil openers is pivoted to a support on a main frame such that it oscillates with the advancing movement of the frame and makes vertical holes in the soil to receive the plants.

U.S. Pat. No. 1,604,624 discloses a planting apparatus in which a plurality of spouts are mounted on a rotating drum.

U.S. Pat. No. 4,637,328 discloses a mechanically-operated no-till planting apparatus for repeatedly and successively penetrating the soil to a predetermined depth at a predetermined spacing, and depositing a quantity of seed or fertiliser.

SUMMARY OF THE INVENTION

According to the invention there is provided a soil opening implement comprising a frame adapted to be moved across a ground surface to be opened, a soil opener mounted on the frame for a repetitive cyclic movement to cause the soil opener to penetrate the ground at a plurality of spaced positions to form a line of holes in the soil, and means for varying the pitch of the holes, that is the spacing between adjacent holes in the direction of movement of the implement, the implement having the facility to deliver objects, such as seeds or fertiliser granules in the holes, either one object per hole or multiple objects per hole, wherein the implement includes a hopper for holding a supply of objects and for delivering the objects to the soil opener which is in the form of a substantially vertical hollow tube through which the objects are fed and delivered to the holes; and wherein the lower end of the tube is angled and tapers to a point, the taper being formed by an angled cut on the trailing side of the opener relative to the direction of movement of the implement.

The angle of the taper is an acute angle, typically about 30° C. The implement as a whole is generally largely comprised of metal, such as steel and/or aluminium.

In the preferred embodiment the repetitive cyclic movement of the soil opener is determined by the profile of a cam rotatably mounted with respect to the frame. Typically, but not necessarily, each soil opener is provided with a respective cam.

In the preferred embodiment, the cams are mounted on a common shaft and their positions along that shaft can be changed (e.g. by loosening a lock nut and sliding the cams along the shaft) in order to allow the soil openers to be set at different row widths. The common camshaft is powered by a different system depending on the required application, for example:

if the implement is used in small scale agriculture where draught animals are used the cam shaft will be powered via a ground wheel and very basic transmission system, toothed belt and pulley or gears so that forward grounds speed can be matched with required shaft speeds in order for the correct seed quantities and spacing to be planted depending on the crop type being planted.

if the implement is used in a commercial operation where tractors are used then the shaft may be powered by the tractor power take-off (PTO) but through a variable speed transmission box that is controlled by a ground speed sensor (a ground wheel or Doppler radar), which will once again match forward speed with shaft speed in order to plant the seeds at the desired seed quantities and spacing.

An important feature of the implement of the present invention is the ability to alter the pitch of the holes formed by the machine. This can be done in a variety of ways. For example, the cams can be replaced with a different set of cams, having a different size and/or profile. Alternatively, the speed of the cam rotation, relative to the forward ground speed of the implement, can be adjusted. Yet another way is simply to adjust the height of the soil openers.

In more sophisticated embodiments of the invention, the pitch could be varied by entering a new program into a control box on the machine.

Another important function of matching ground speed to the camshaft speed, and hence reciprocating speed, is to prevent the soil openers from becoming clogged. The soil openers should enter the soil at a slightly slower rate than ground speed so that the rear of the soil openers create a slot behind them into which the seed is planted. The frame may be attached to either the tractor lifting arms or its drawbar. It can alternatively be attached to a draught animal harness. The speed of forward movement of the tractor or draught animal, as appropriate, is then related to the rotational speed of the cam shaft to provide the required frequency of up and down movement of the soil openers.

The implement conveniently comprises one or more following rollers or press wheels positioned towards the rear of the apparatus, which close the holes created in the soil once a seed or other object has been deposited therein—this helps to prevent animals eating the seeds.

The soil opener described in this specification solves all the problems of the prior art and is suited to planting in any conditions from a finely tilled seed bed, to manmade coverings such as plastic sheeting, to soil which is thickly covered by crop residues or other vegetation but it is particularly well suited to planting into the soil through rather thick crop, or other vegetation, residue lying on the soil, without the necessity to remove the crop residue. A proper penetration is achieved through the residues/coverings and the seeds are placed into the soil at accurate depths. The seeds are well protected due to the soil slot creating and closing method, which makes it very difficult for pests to follow the soil slot path. The new soil opener requires much less weight, draught and power than the current soil openers which considerably reduces the size and weight of the machine and thus the tractor required to pull it, resulting in further reduced fuel usage and compaction problems. The soil opening implement is designed and matched to its pitch variables in such a way as to prevent it from clogging up with soil and debris when it is in operation. The placement and shape or profile of the slot can be infinitely varied in order to maximise the growth conditions for the seed, by adjusting the soil opener to the current ground conditions, to reduce the overall power and draught requirements for the machine and reduce the wear and tear of the machine. This invention also allows for up to 80% less fuel to be burnt during crop establishment activities and for greater manoeuvrability in a field whilst in operation.

BRIEF DESCRIPTION OF THE DRAWINGS

Soil opening implements forming preferred embodiments of the invention will now be described, by way of example, with reference to the accompanying drawings, in which.

DETAILED DESCRIPTION OF THE DRAWINGS

Figure 1:
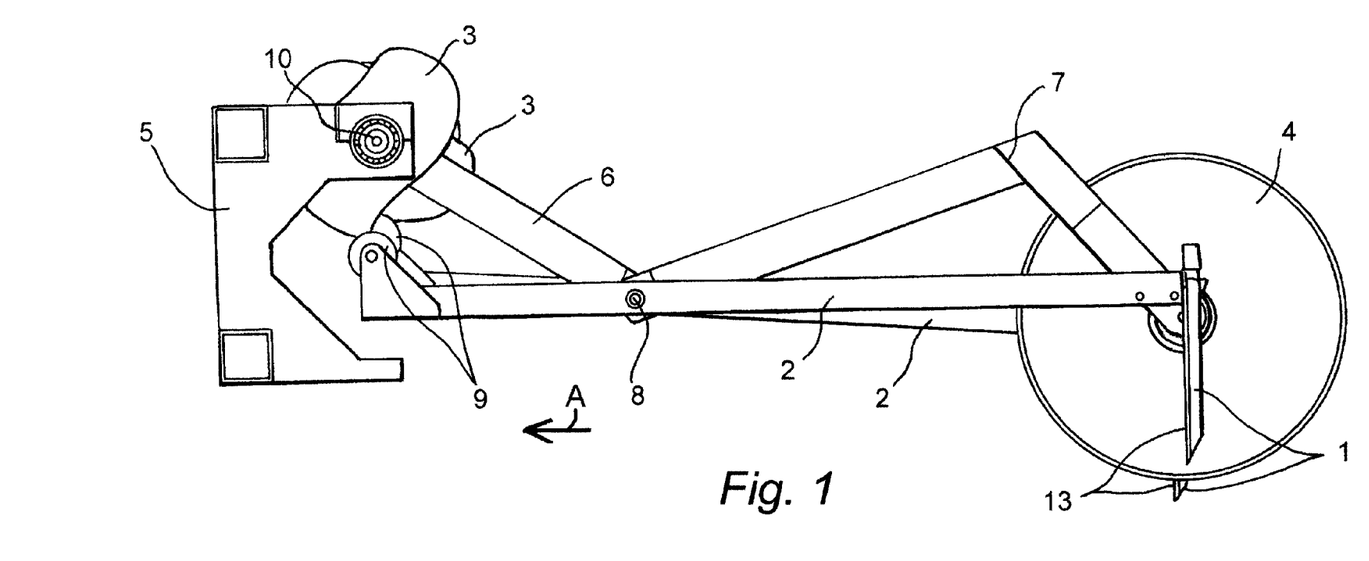
FIG. 1 is a side view of a first implement in accordance with the invention.
Figure 2:
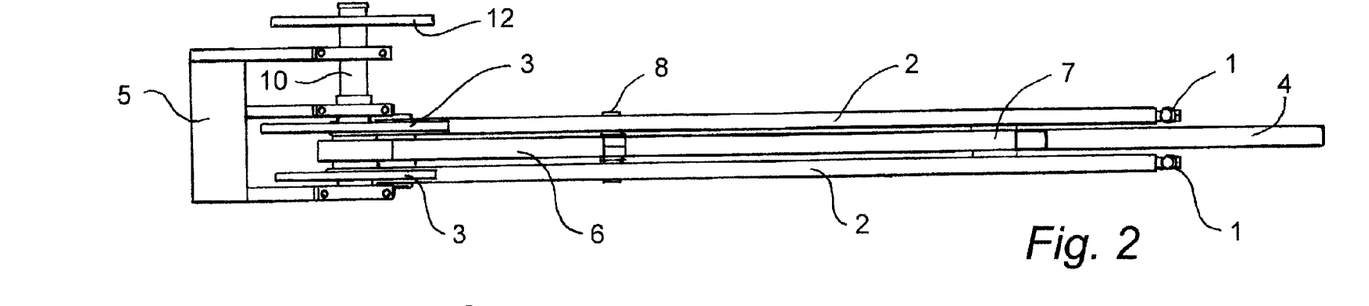
FIG. 2 is a plan view of the implement of FIG. 1.

Referring initially to FIGS. 1 and 2, the implement has a frame 5 which is adapted to be towed by a prime mover, such as a tractor or draught animal, in a forward direction of movement represented by the arrow A in FIG. 1.

A shaft 10 is rotatably mounted in the frame 5 about a transverse horizontal axis of rotation, and the shaft 10 carries two spaced cams 3 and a drive wheel 12 by which rotational power is transmitted to the shaft 10.

The forward end of a short tow bar 6 is journalled on the shaft 10. The rear end of the tow bar 6 is pivotally attached, at a pivot point 8, to the forward end of a longer depth wheel bar 7 which is cranked and the rear end of which carries bifurcated brackets, the lower extremities of which form a horizontal pivot bearing for a wheel 4 which is thus capable of rotational movement about a transverse horizontal axis.

A pair of elongated operating arms or levers 2 have forward ends carrying cam followers 9 in respective engagement with the two cams 3. The levers 2 are pivotally connected to one another, and to the bars 6 and 7, at the common pivot point 8. The rear end of each operating lever 2 carries a soil opener 1 in the form of a depending hollow tube with a lower angled end 13 tapering to a point. The two soil openers 1 are positioned close to, and on respective sides of, the wheel 4. (This is formed by an angled cut on the trailing side of the tube forming the soil opener).

The two cams 3 are mounted on the shaft 10 such that when cam follower 9 is at a position of maximum displacement from the shaft 10 the other cam follower 9 is at a position of minimum displacement from the shaft 10. As a result, the two levers 2, and therefore the two soil openers 1, move in antiphase.

In the illustrated embodiment, the anti-phase arrangement of the soil openers is 180°, which can provide for balanced operation and smooth power demand. However, in other embodiments the soil openers may be more or less than 180° out of phase. Indeed, in certain circumstances (particularly for multi-row machines) it may be more advantageous to arrange the cams such that the soil openers are not at 180° anti-phase. One especially preferred embodiment would be to arrange for the least amount of soil openers to be down at any one moment and to mirror opposite sides of the machine (e.g. with both outermost openers running in phase with each other; the next inward pairs of openers running in phase with one another, and so on, into the middle of the machine). This "mirror image" arrangement would reduce the draft requirement significantly, improve balance and maintain more even torque on the cam shaft.

In the illustrated embodiment, the positions of cams 3 on the shaft 10 are adjustable by loosening lock nuts and sliding the cams 3 along the shaft, in order to allow the soil openers to be set at different widths.

In a simple system where the implement is drawn by a draught animal, the cam shaft 10 is powered by a ground wheel and a transmission system so that the forward speed of the implement can be matched to the desired frequency of oscillation of the levers 2.

Rotation of the shaft 10 causes the operating levers 2 to rock up and down, about the pivot point 8, causing the soil openers 1 to move up and down with a reciprocating motion relative to the frame 5. In the uppermost position (shown for the nearer opener 1 in FIG. 1), the pointed end 13 of the opener is above the outer periphery of the wheel 4. In the lowermost position (shown for the further opener 1 in FIG. 1), the pointed end 13 of the opener is below the outer periphery of the wheel 4. Thus, as the implement is drawn in the forward direction of the arrow A, the wheel 4 rolls along the ground surface and the soil openers 1 move up and down with a repetitive cyclic movement, opening two lines of holes in the ground at a chosen spacing determined by the transmission system.

The implement shown in FIGS. 1 and 2 not only opens the soil by forming two lines of holes at a selected spacing, it also delivers a seed or seeds into each hole formed by the openers 1. The main store of seed will be held in a large single hopper which will dispense the seed to small pre-metering hoppers situated just above the soil openers 1. The metering mechanism under the small hopper meters the seed out at the required rate into a telescopic or stretchable tube which drops vertically downwards from the meter and attaches to the top of the soil openers 1 which are hollow. The seed once released into the tube from the meter is propelled through the tube and soil opener 1 by a timed, short air blast and ejected out the bottom of the soil opener 1 into the soil slot. The soil opener will then rise out of the slot and the slot will be closed by a press wheel following behind the soil openers 1.

The depth of each hole formed by the soil openers is adjustable to suit the soil conditions, the seed being sown and any other relevant factors. Depth control is achieved by adjusting the extent of projection of the lower ends of the openers 1 beyond the outer periphery of the wheel 4. This can be done by altering the angle between the bars 6 and 7 at their meeting point 8, e.g. by clamping them together at the required angle at the pivot point 8.

Alternatively, the bar 7 can be made as two link members which can be adjusted and clamped at a desired relative angle, instead of being cranked as shown in FIG. 1.

The two soil openers 1 reciprocate in anti-phase, this having the following advantages:

- the forces are partially balanced out as one soil opener is moving downwards and the other is moving upwards;
- having two openers per planting row halves the frequency at which the soil openers have to reciprocate in order to maintain seeding rate; and
- having two soil openers 1 also halves the forces created whilst the implement is in operation thus allowing the implement to maintain a reasonable speed across the field.

The described system uses a ground-engaging wheel to detect implement speed. Alternative sensors may employ electromagnetic or soundwaves to sense forward travel of the implement. The sensors used would be placed a reasonable distance, around one meter, directly in front of each individual soil opener 1 so that they can sense exactly what is under the surface directly ahead of the soil openers 1. The information that the sensors gather would be fed to a central computer which would then merge this information with the ideal seed rates, ideal moisture conditions, ideal planting depth and soil/humus content requirements for the crop being planted, which would be pre-programmed into the computer. The computer would then calculate the ideal placement for the seed within a certain circular soil area of the ideal plant spacing, thus ensuring seeds are placed in the optimum position for strong growth in that particular small area. The sensors used would be as follows:

Soil Moisture sensor; this would measure the minor variations of soil moisture content to a set depth. The information that it provides to the computer will allow the computer to compare the real conditions on the ground to the ideal conditions it has pre-programmed into it and thus make an informed decision as to the best place to put the seed, depending on data gathered by:

Mineral/humus soil ratio sensor; this sensor would measure the humus content of the soil in layers to ensure that the seed is placed in soil which has a higher mineral content than humus because seed soil contact is important for healthy seed germination because a seed placed in an area that has too high a humus level stands a high chance of rotting before it germinates. There are also a number of other reasons the main ones being: seed protection and root development.

Figure 3:
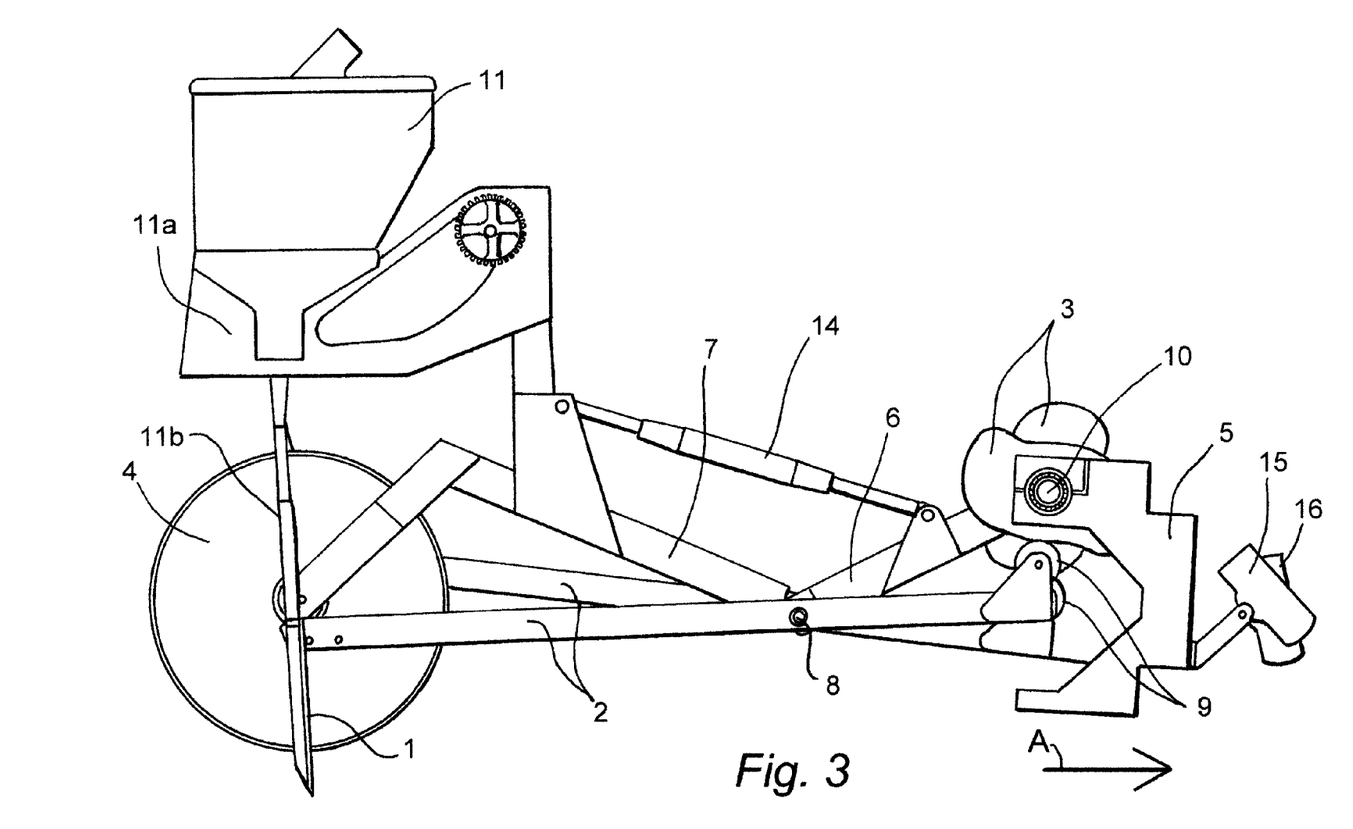
FIGS. 3 and 4 are side and isometric views of a second implement in accordance with the invention.
Figure 4:
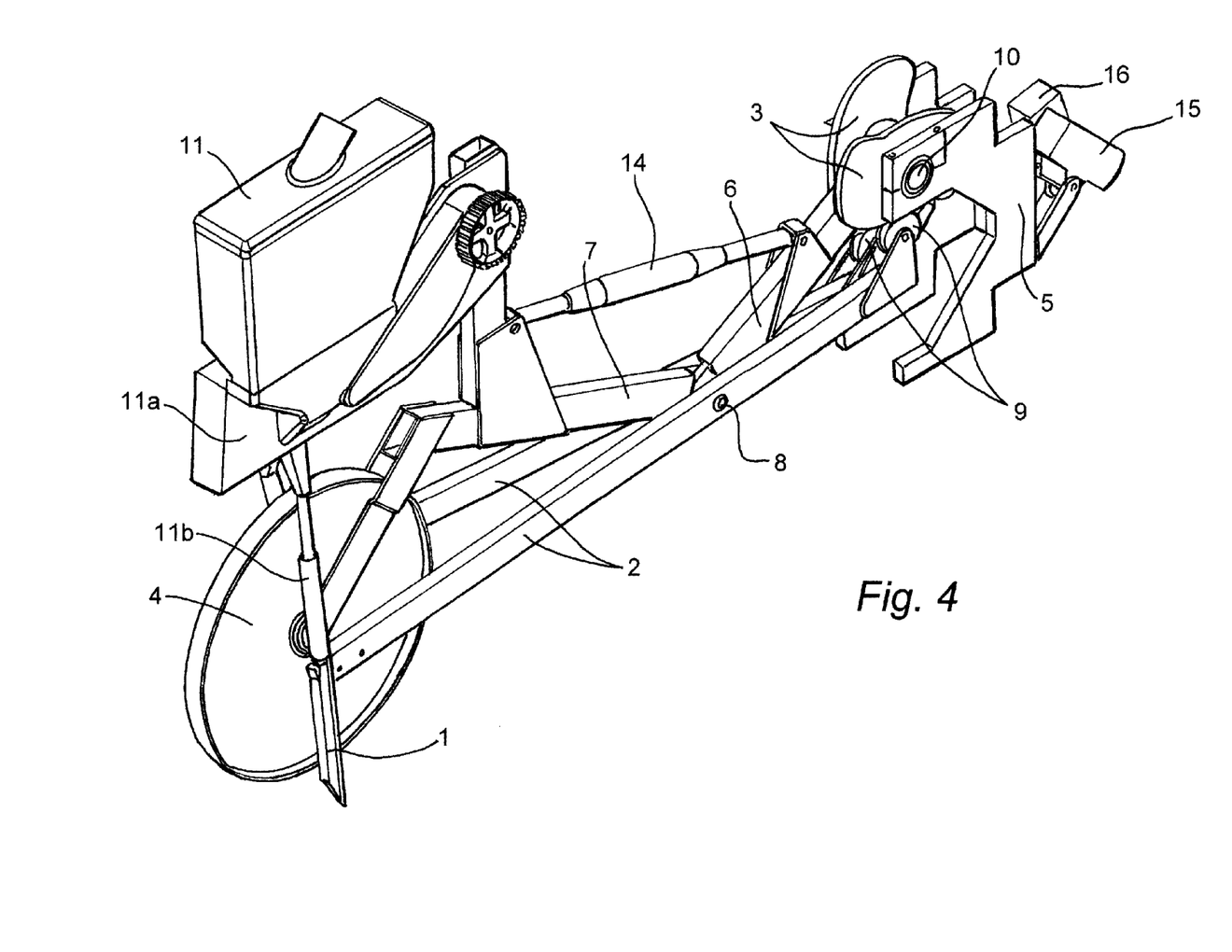

FIGS. 3 and 4 are views of an implement similar to that shown in FIGS. 1 and 2 but illustrating additional features. Parts corresponding to those in FIGS. 1 and 2 bear the same reference numerals.

In FIG. 3 the forward direction of travel, indicated by the arrow A, is from left to right. The implement has a pre-metering hopper 11 for holding seed, a meter 11a for controlling the rate of delivery of the seed from the hopper to a pair of seed delivery tubes 11b which in turn feed the seed to the two openers 1. The angle between the bars 6 and 7 is adjusted by means of a depth adjusting bar 14. Varying the length of the bar 14 varies the depth of penetration of the openers 1.

The forward end of the frame carries a moisture level sensor sender unit 15 and an organic content sensor receiver unit 16, the signals from which may be fed to a controlling computer of the implement.

Figure 5:
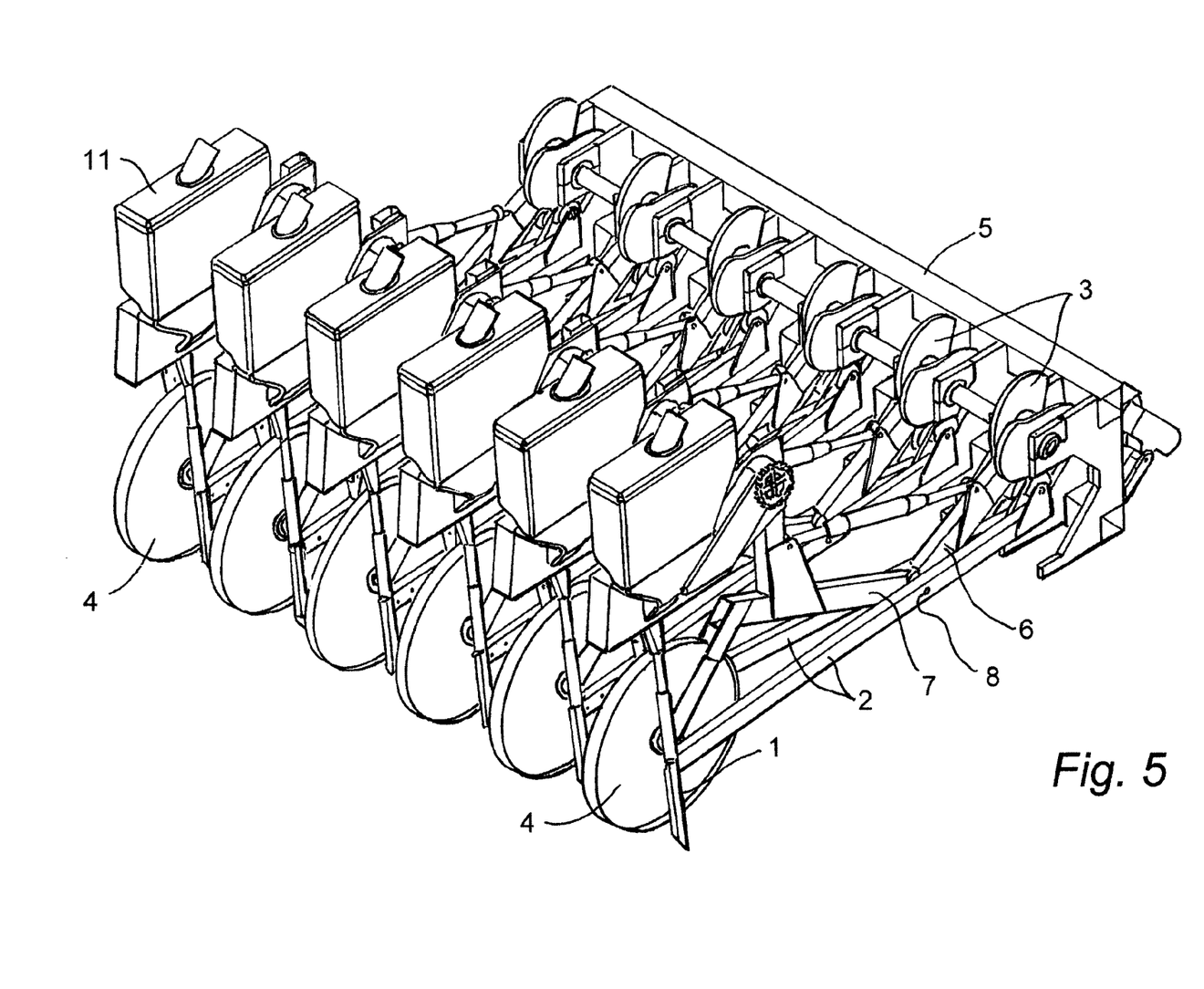
FIG. 5 is an isometric view of a third implement in accordance with the invention.

FIG. 5 is an isometric view of an implement equipped with a plurality of laterally spaced units, each corresponding to those of FIGS. 3 and 4, to provide a multiple row assembly. It can be seen that the cams 3 are positioned on the camshaft so that all the soil openers 1 visible in FIG. 5 reciprocate in unison, the remaining soil openers 1 (i.e. those hidden from view in FIG. 5) reciprocating in unison and in anti-phase to the visible soil openers 1. The apparatus is also equipped with a tow bar, a main seed hopper, feed pipes, and rear press wheels (to close the soil slots behind the apparatus) although these are all omitted from the drawing for improved clarity.

Figure 6:
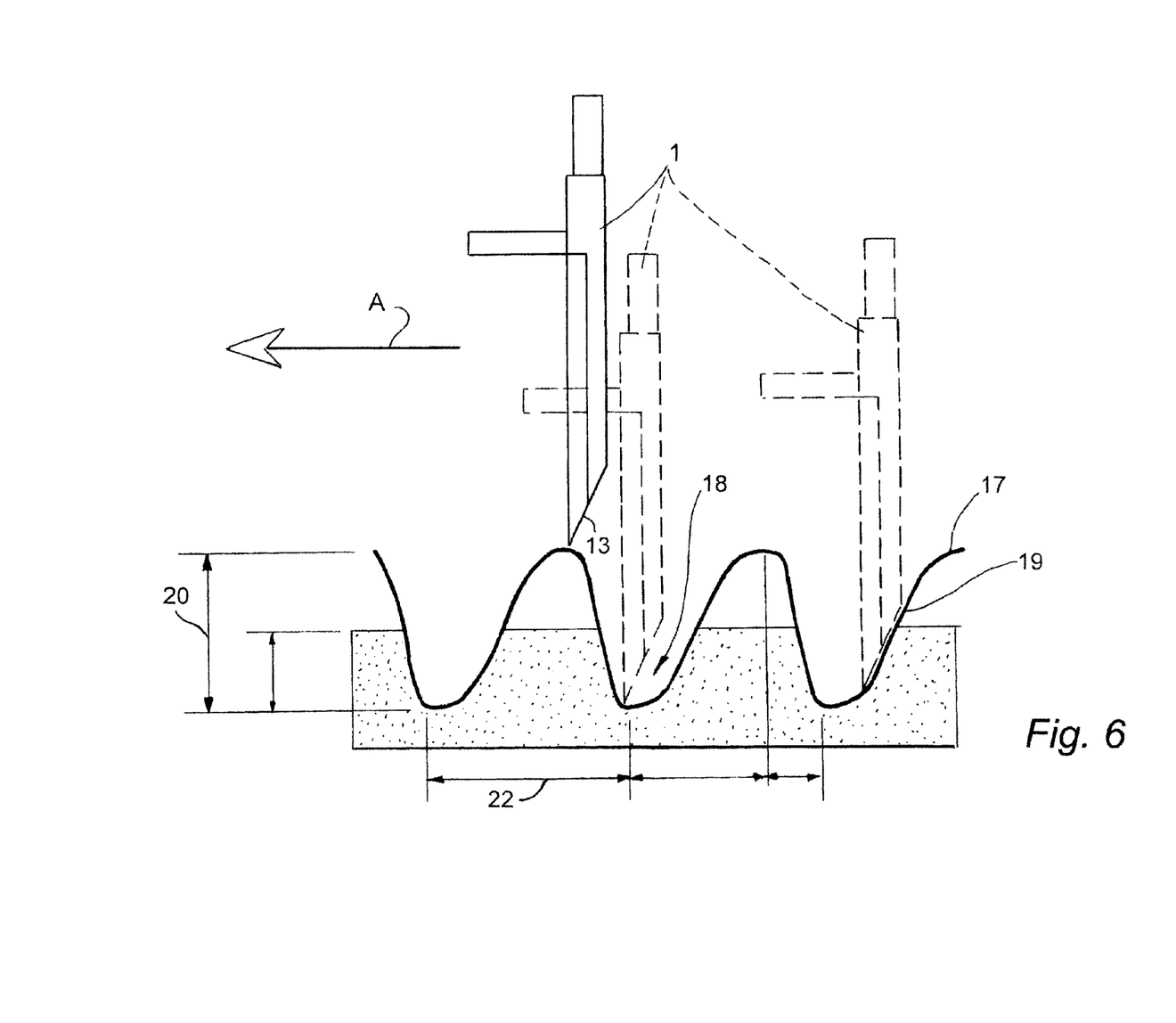
FIG. 6 is a diagram illustrating the path of movement of a soil opener of the first, second or third implements.
Figure 7:
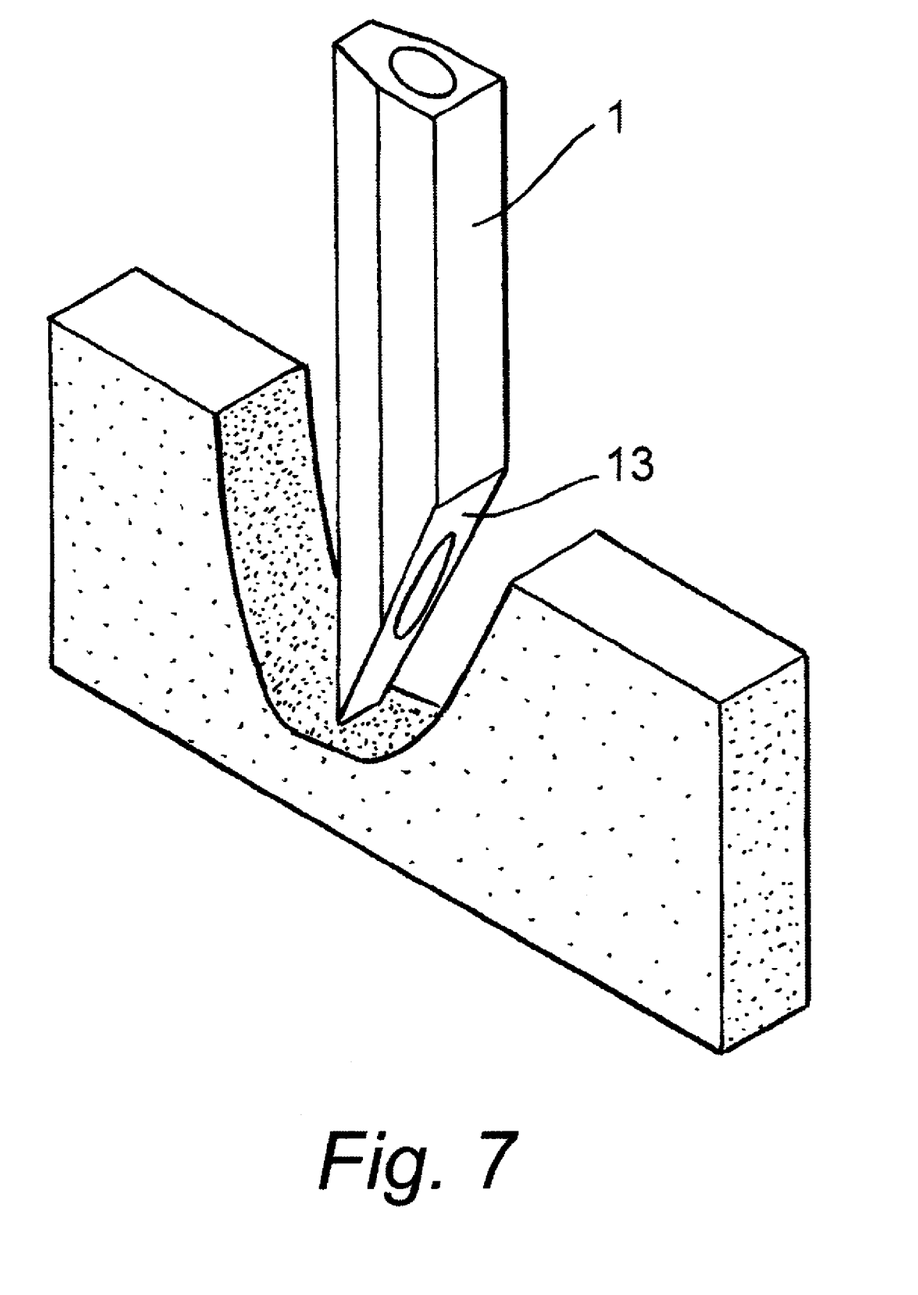
FIG. 7 is a fragmentary isometric view showing how seed is delivered into a soil slot formed by the first, second or third implement.

FIG. 6 illustrates the locus 17 of the movement of the end 13 of a soil opener 1 as the implement is towed in the direction of travel A. The opener 1 is illustrated at three points in its cycle of movement. The seed is delivered into the hole or slot in the soil when the opener 1 is at the bottom dead centre of its movement, indicated by 18. The slope 19 of the slot or hole formed by the opener in the soil should not be steeper than the angle end 13 of the opener, so as to prevent clogging. 20 depicts the variable amplitude of the path followed by the soil openers and 22 indicates the pitch of the hole or slots. The locus of the path followed by the soil openers can be infinitely varied, within the constraints of the apparatus, according to any particular set of circumstances or requirements. The smaller vertical arrow to the right of arrow 20 indicates the (variable) depth of soil penetration achieved by the soil openers. The moment of seed delivery into a representative slot is shown in FIG. 7.

The invention claimed is:

1. A soil opening implement comprising: a frame adapted to be moved across a ground surface to be opened; a soil opener mounted on the frame for a repetitive cyclic movement to cause the soil opener to penetrate the ground at a plurality of spaced positions to form a line of holes in the soil, and means for varying the pitch of the holes, that is the spacing between adjacent holes in the direction of movement of the implement, the implement having the facility to deliver objects in the holes, either one object per hole or multiple objects per hole; the implement further comprising a hopper for holding a supply of objects and for delivering the objects to the soil opener which is in the form of a substantially vertical hollow tube through which the objects are fed and delivered to the holes; and wherein the lower end of the tube is angled and tapers to a point, the taper being formed by an angled cut on the trailing side of the opener relative to the direction of movement of the implement; the implement further comprising a cam rotatably mounted with respect to the frame, the profile of said cam being engaged by a cam follower which moves an operating lever, oscillation of which lever moves the soil opener.

2. An implement according to claim 1, wherein the angle at the lower end of the tube is equal to or steeper than the angle of inclination of the travel path followed by the lower end of the soil opener as said soil opener enters the ground.

3. An implement according to claim 1, wherein the repetitive movement of the soil opener is substantially vertical relative to the frame.

4. An implement according to claim 1, wherein the means for varying the pitch of the holes includes a ground speed sensor and the facility to alter the cycle time of the soil opener in relation to the forward speed of travel of the implement as detected by the ground speed sensor.

5. An implement according to claim 4, wherein the ground speed sensor includes a ground-engaging wheel or a sensor utilising electromagnetic or soundwaves to sense forward movement of travel of the implement.

6. An implement according to claim 1, further comprising depth control means to adjust the depth of penetration of the soil opener and hence the depth of the holes.

7. An implement according to claim 6, wherein the depth control means includes a ground-engaging wheel with the facility of adjusting the extent of projection of the soil opener beyond the wheel periphery to control depth.

8. An implement according to claim 1, wherein the frame carries a plurality of laterally spaced soil openers to produce a plurality of lines of holes in the ground.

9. An implement according to claim 1, the implement having the facility to deliver seeds or fertilizer granules.

* * * * *